June 30, 1942. J. S. MATASY ET AL 2,288,009

FISHING LURE OR ARTIFICAL FISHING BAIT

Filed June 26, 1940

Inventors
JOSEPH S. MATASY
ANDREW P. BALLENTYNE
By A H Oldham Attorney

Patented June 30, 1942

2,288,009

UNITED STATES PATENT OFFICE 2,288,009

FISHING LURE OR ARTIFICIAL FISHING BAIT

Joseph Stephen Matasy and Andrew Paul Ballantyne, Youngstown, Ohio

Application June 26, 1940, Serial No. 342,490

5 Claims. (Cl. 43—46)

This invention relates to fish lures, and, more particularly, is concerned with casting or trolling artificial fish baits or lures.

It is the general object of our invention to provide an artificial lure, usually of the casting or trolling type, which has excellent fish catching characteristics when in use, and which, when not in use, can be substantially instantly adjusted so as to render it completely safe to handle and carry in the pocket or the tackle box.

Another object of our invention is to provide a bait casting fish lure including a hook or hooks adapted to be quickly adjusted from a fully exposed fish catching position to a position with the points and barbs of the hooks within the body of the lure so that the lure can be safely handled when not in use without any danger of the hook or hooks catching in the flesh or clothes of the user or becoming tangled with other lures in the tackle box.

Another object of our invention is the provision of a fish lure of the character indicated and wherein the hook or hooks can be locked in the sheathed or concealed position within the body of the fish lure.

The foregoing and other objects of our invention are achieved by the provision of a fishing lure comprising a body having an aperture extending from one surface to another of the body, the body having a slot which passes through the periphery thereof, means extending through the aperture, and a hook secured to one end of the means, the hook being outside of the body during the use of the lure, the other end of the means being movable to draw the point and barb of the hook within the slot so that they are within the periphery of the body when the lure is not in use.

Figure 1:
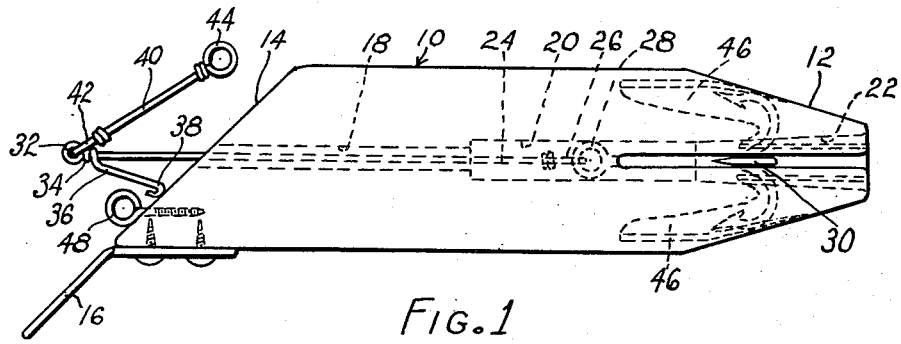
Figure 2:
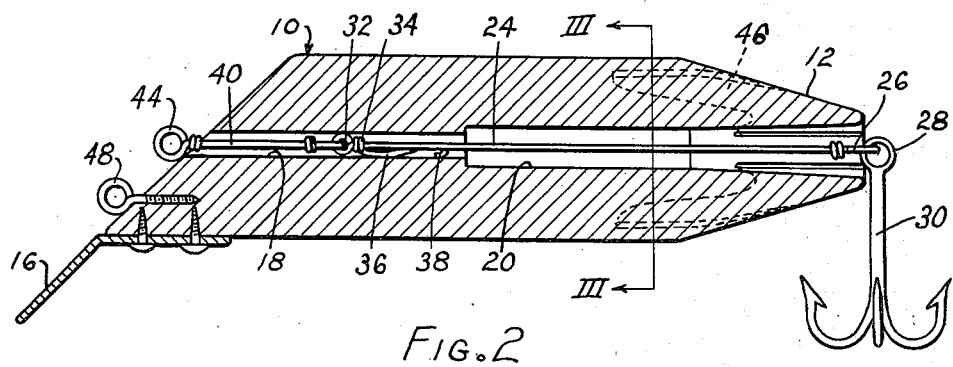
Figure 3:
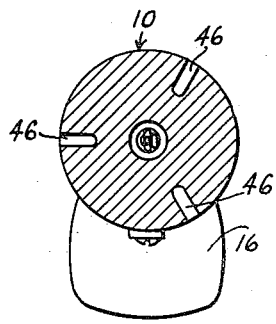
Figure 4:
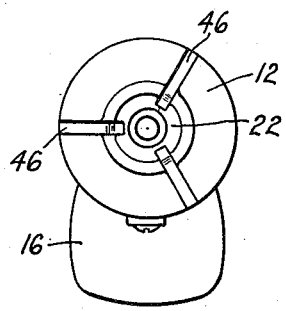
Figure 5:
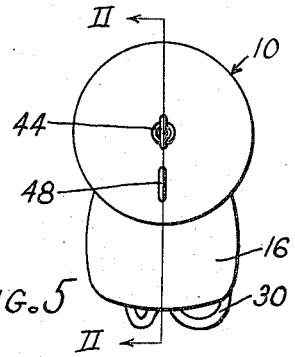

For a better understanding of my invention reference should be had to the accompanying drawing wherein Fig. 1 is a side elevation of our improved lure with the hooks in the sheathed or concealed position; Fig. 2 is a longitudinal sectional view of the fish lure of Fig. 1 taken on line II—II of Fig. 5, but with the hooks being positioned in their fish catching position; Fig. 3 is a cross-sectional view taken on line III—III of Fig. 2; Fig. 4 is an end elevation of the lure taken from the back end thereof, but with the hooks and hook-positioning means removed; and Fig. 5 is a front elevation of our improved lure.

Having particular reference to the drawing, the numeral 10 indicates generally the body portion of our improved fish lure. The body 10 is preferably made to simulate the general appearance and movement of a minnow or other fish when pulled through the water, and to this end, the body 10 is generally cylindrical in cross-section as shown and is formed with a tapered back end 12 and a beveled head or face 14. We may secure a lip 16 to the under side of the head of the body to further effect and control the movements of the lure through the water. The body 10 of the lure is made of any suitable solid material, such as metal, plastic, or wood but is conveniently made from wood. The lip 16 is generally of thin metal, as will be understood.

The body portion 10 of our improved lure is formed with an aperture from one surface thereof to another, and in the embodiment of our invention illustrated the aperture takes the form of a longitudinal bore 18, a counterbore 20 of slightly larger diameter, and a slightly beveled end portion 22 on the counterbore 20. Rod, wire, gut, string, or other suitable means, such as the piano wire 24 extend through the bore 18. The wire 24 is formed at its rear end with an eye 26 which engages with the eye 28 of a gang hook 30. The front end of the wire 24 is turned back on itself to form an eye 32, the wire is wrapped around the main stretch of the wire, as at 34, and a length of the wire, indicated as 36, extends at a slight angle to the main portion of the wire 24, as seen in Fig. 1. However, the portion 36 of the wire can be sprung down substantially parallel with the main portion of the wire 24, as shown in Fig. 2, so that the wire 24 can be moved in the bore 18. The end of the portion 36 of the wire 24 is bent sharply back on itself, as at 38 so that it will not catch in the bore 18, and can be readily moved into or out of the bore.

To the eye 32 we secure a short length of wire 40, or other strand material which is provided with an eye 42 secured to the eye 32, and which has at its outermost end an eye 44 which serves as a stop, as seen in Fig. 2 to prevent the wires 24 and 40 from moving or pulling completely through the bore 18. The eye 44 also serves as a handle or grip means for pulling the wires 24 and 40 from the position shown in Fig. 2 to that illustrated in Fig. 1.

The rear or back end of the body portion 10 of the lure is formed with a plurality of circumferentially-spaced slots 46 which are adapted to receive the points and barbs of the hooks comprising the gang hook 30. The slots 46 are shown to be three in number, but in this connection it should be understood that the number of slots provided is usually made equal to the number of individual points and barbs of the hook or hooks carried by the eye 26 of the wire 24. In other words, we particularly contemplate using not only the standard gang hook, including three individual hooks, but we also may provide the lure with any number of hooks, for example, with but a single hook in which case only a single slot in the body of the lure is necessitated. Usually, the slots 46 are of a size so that the points and barbs of the hooks can be positioned completely within the periphery of the body as best seen in Fig. 1.

Completing the lure, we provide an eye 48 which is secured to the front or face 14 of the body 10 and to which the fish line is fastened.

From the foregoing it will be recognized that the objects of our invention have been achieved by the provision of a fish lure which can be very quickly changed or adjusted from the fishing position shown in Fig. 2 with the gang hook 30 fully exposed, to the non-fishing position shown in Fig. 1 wherein the hook 30 has its points and barbs positioned completely within the periphery of the body 10. It will be evident that this change can be accomplished by pulling the eye 40 away from the head of the lure so that the wire 24 is drawn toward the front end of the bore 18 and counterbore 20 to thereby pull the hook 30 into the funnel-shaped opening 22 forming the end of the counterbore 20 at which time the points and barbs of the hooks slide into the slots or recesses 46. The hook 30 is locked in the sheathed, concealed, or recessed position shown in Fig. 1 by having the wire portion 36 spring down due to its inherent resiliency to the position shown in Fig. 1 so that the turned over end 38 thereof engages with the face 14 of the body 10 of the lure. With the hooks 30 in the sheathed position the lure may be safely carried in the pocket of the user without danger that the hooks will catch either in the flesh or clothing of the user. The hard body 10 fully covers and conceals the points and barbs of the hook at all times. Also, the lure can be safely carried in a tackle box without danger that it will become tangled up with other parts of the tackle.

To change the lure from the inoperative position shown in Fig. 1 to the fishing position shown in Fig. 2 it is only necessary to depress the wire portion 36 and introduce the end 38 thereof into the bore 18 at which time the wire 24 can be readily slid together with the wire 40 back into the bore 18 to drop the hook 30 down to the position shown in Fig. 2. The eye 44 striking the end of the bore 18 prevents further backward movement of the wires 24 and 40 and the hook 30 even though a relatively large fish is caught on the hook 30.

While in accordance with the patent statutes we have specifically illustrated and described one best known embodiment of our invention, it should be particularly understood that we are not to be limited thereto or thereby, but that the scope of our invention is defined in the appended claims.

We claim:

1. A fishing lure comprising a body simulating the shape of a fish and having a longitudinal bore therethrough, a gang hook, means extending through the longitudinal bore and secured to the gang hook, a stop on the front end of said means to limit the backward movement of said means in the bore and so constructed and arranged that when such limit is reached the gang hook will hang free of the body in fish-engaging position, said body having a plurality of longitudinally extending slots adjacent the rear portion thereof so that when the means is pulled forwardly in the longitudinal bore the points and barbs of the gang hook are received in the slots and are completely covered and inoperative, and a lock associated with the end of said means opposite the gang hook for securing the means to hold the gang hook in inoperative position.

2. A fish lure of the type used for bait casting and like fishing comprising a fish-shaped body made of solid, non-yielding material, a hook, means securing the hook to the body so that the hook can be positioned either in a normal fish-engaging position with the point and barb of the hook fully exposed during the complete time the lure is in use or in a position with the complete shank, curved end, point and barb of the hook fully received and covered within a suitable relatively deep recess in the body when the lure is not in use.

3. A fishing lure having a fish-like body formed with an aperture extending from one surface thereof to another, means extending through the aperture, a hook secured to one end of the means and extending in fish-engaging position during the use of the lure, said end of the means opposite the hook being formed with a stop adapted to engage with the body when the hook is in fish-engaging position and adapted to be pulled to draw the point and barb of the hook within the periphery of the body which is appropriately recessed to receive them, and a lock for holding the point and barb of the hook within the periphery of the body.

4. A fishing lure having a fish-like body formed of solid, non-yielding material, and having a hook-receiving recess associated therewith, a hook, means securing the hook permanently to the body adjacent the hook-receiving recess, the means and the recess being so constructed and arranged that the hook is positioned in full fish-engaging position during the use of the lure but permitting the movement of the hook into the recess to completely cover the point and barb of the hook when the lure is not in use, and means for holding the hook in the recess when the lure is not in use.

5. A fishing lure having a non-yielding fish-like body formed with an aperture extending from one surface thereof to another, means extending through the aperture, a hook secured to one end of the means and extending in fish engaging position during the use of the lure, said end of the means opposite the hook being adapted to be pulled when the lure is to be put out of use to draw the point and barb of the hook within the periphery of the non-yielding body which is appropriately recessed to receive them.

JOSEPH STEPHEN MATASY.
ANDREW PAUL BALLANTYNE.